US009333409B2

(12) United States Patent
Jang et al.

(10) Patent No.: US 9,333,409 B2
(45) Date of Patent: May 10, 2016

(54) VIRTUAL GOLF SIMULATION APPARATUS AND SENSING DEVICE AND METHOD USED FOR THE SAME

(75) Inventors: Hyung Wook Jang, Daejeon (KR); Hyun Jin Park, Daejeon (KR); Hyung Sik Yoon, Daejeon (KR); Hyun Dam Jeong, Daejeon (KR)

(73) Assignee: GOLFZON CO., LTD., Daejeon (KR)

( * ) Notice: Subject to any disclaimer, the term of this patent is extended or adjusted under 35 U.S.C. 154(b) by 305 days.

(21) Appl. No.: 14/004,935

(22) PCT Filed: Mar. 22, 2012

(86) PCT No.: PCT/KR2012/002083
§ 371 (c)(1),
(2), (4) Date: Sep. 13, 2013

(87) PCT Pub. No.: WO2012/128574
PCT Pub. Date: Sep. 27, 2012

(65) Prior Publication Data
US 2014/0004969 A1    Jan. 2, 2014

(30) Foreign Application Priority Data

Mar. 22, 2011    (KR) .......................... 10-2011-0025150

(51) Int. Cl.
| | |
|---|---|
| *G06K 9/00* | (2006.01) |
| *A63B 69/36* | (2006.01) |
| *G09B 19/00* | (2006.01) |
| *A63B 67/02* | (2006.01) |
| *G06T 7/20* | (2006.01) |

(52) U.S. Cl.
CPC ............. *A63B 69/3658* (2013.01); *A63B 67/02* (2013.01); *G06T 7/204* (2013.01); *G06T 7/2053* (2013.01); *G09B 19/0038* (2013.01); *G06T 2207/30224* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 5,333,874 A | 8/1994 | Arnold et al. | |
| 5,846,139 A | 12/1998 | Bair et al. | |
| 6,579,190 B2 | 6/2003 | Yamamoto | |
| 7,641,565 B2 | 1/2010 | Kiraly | |
| 7,815,516 B1* | 10/2010 | Mortimer | A63B 24/0021 473/257 |
| 2008/0291220 A1* | 11/2008 | Cheng | A63F 13/10 345/632 |
| 2009/0270204 A1* | 10/2009 | Saegusa | A63B 24/0003 473/409 |
| 2010/0104136 A1* | 4/2010 | Kiraly | A63B 69/3658 382/103 |
| 2010/0184496 A1 | 7/2010 | Nicora et al. | |

* cited by examiner

*Primary Examiner* — Jason Yen
(74) *Attorney, Agent, or Firm* — Revolution IP, PLLC

(57) ABSTRACT

Disclosed are a virtual golf simulation apparatus in which an image of a ball hit by a user using virtual golf simulation, who swings a golf club to hit the ball, is acquired, and the ball is found from the acquired image to calculate the moving trajectory of the ball, thereby realizing a simulation image of the trajectory of the ball, and, particularly, in which the two-dimensional trajectory of ball candidates, determined as a ball, in an image acquired by the camera is analyzed to accurately and rapidly extract the ball, thereby accurately and rapidly calculating information on physical properties of the moving ball even using a camera having a low resolution and velocity, and a sensing device and method used for the same.

14 Claims, 10 Drawing Sheets

(a)

(b)

(a)

(b)

(c)

(a)

(b)

|  | frame 1 | frame 2 | frame 3 | .... |
|---|---|---|---|---|
| Track 1 ⇒ | 1_1 | 2_1 | 3_1 | .... |
| Track 2 ⇒ | 1_1 | 2_1 | 3_2 | .... |
| Track 3 ⇒ | 1_1 | 2_2 | 3_1 | .... |
| Track 4 ⇒ | 1_1 | 2_2 | 3_2 | .... |
| Track 5 ⇒ | 1_2 | 2_1 | 3_1 | .... |

VIRTUAL GOLF SIMULATION APPARATUS AND SENSING DEVICE AND METHOD USED FOR THE SAME

CROSS REFERENCE TO PRIOR APPLICATIONS

This application is a National Stage Application of PCT International Patent Application No. PCT/KR2012/002083 filed on Mar. 22, 2012, under 35 U.S.C. §371, which claims priority to Korean Patent Application No. 10-2011-0025150 filed on Mar. 22, 2011, which are all hereby incorporated by reference in their entirety.

TECHNICAL FIELD

The present invention relates to a virtual golf simulation apparatus and a sensing device and method used for the same, and more particularly to a virtual golf simulation apparatus in which a virtual golf course is imaged and simulated, and the trajectory of a golf ball hit by a user is sensed by a sensing device and is simulated on the virtual golf course, and a sensing device and method used for the same.

BACKGROUND ART

In recent years, various devices have been developed which allow users to enjoy popular sports games, such as baseball, soccer, basketball and golf, in rooms or in specific places through simulation in the form of interactive sports games.

Particularly, in recent years, a so-called screen golf system has been developed in which, when a user swings a golf club to hit a golf ball placed on a hitting mat, a sensing device senses the hit golf ball to extract physical information on the moving golf ball so that the trajectory of the golf ball can be simulated on a virtual golf course, thereby allowing the user to enjoy golf in virtual reality.

In order to simulate sports using balls, such as golf balls, in such interactive sports games, much research has been conducted into various sensing systems for accurately sensing physical information on a moving ball, i.e. movement of a ball.

For example, various sensing devices, such as a sensing device using an infrared sensor, a sensing device using a laser sensor, a sensing device using an acoustic sensor and a sensing device using a camera sensor, have come onto the market. Much research has been conducted into a camera sensor type sensing device for acquiring and analyzing an image of a moving ball to accurately sense a state of the moving ball.

In the camera sensor type sensing device, however, an ultrahigh-speed camera having a high resolution is necessary for accurate sensing, which greatly increases costs of the sensing device. On the other hand, if a camera having a relatively low resolution and a relatively low speed is used, the quality of an image acquired by the camera is low with the result that it is very difficult to accurately extract and analyze a ball.

DISCLOSURE

Technical Problem

It is an object of the present invention to provide a virtual golf simulation apparatus and a sensing device and method used for the same in which an image of a golf ball hit by a user using virtual golf simulation, who swings a golf club to hit the golf ball, is acquired, and the golf ball is found from the acquired image to calculate the moving trajectory of the golf ball, thereby realizing a simulation image of the trajectory of the golf ball, and, particularly, in which two-dimensional trajectories of ball candidates, recognized as a ball, in an image acquired by the camera are analyzed to accurately and rapidly extract the ball, thereby accurately and rapidly calculating information on physical properties of the moving ball even using a camera having a low resolution and velocity.

Technical Solution

In accordance with an aspect of the present invention, the above and other objects can be accomplished by the provision of a sensing device used in a virtual golf simulation apparatus, including a camera unit for acquiring a plurality of frame images of a ball hit by a user who swings at the ball and a sensing processing unit for extracting ball candidates from the acquired frame images, converting three-dimensional coordinates of each of the ball candidates into two-dimensional coordinates, and analyzing a two-dimensional trajectory of each of the ball candidates to extract a trajectory of the ball, thereby calculating information on physical properties of the moving ball.

In accordance with another aspect of the present invention, there is provided a virtual golf simulation apparatus including a sensing device including a camera unit for acquiring a plurality of frame images of a ball hit by a user who swings at the ball and a sensing processing unit including a ball trajectory listing means for extracting ball candidates from the respective frames with respect to the acquired images and for creating a ball trajectory list to connect the respective ball candidates with respect to the successive frames and a ball trajectory determination means for performing second-order polynomial regression analysis with respect to the created ball trajectory list to create ball trajectory candidates and for extracting the trajectory of a ball from the ball trajectory candidates according to a predetermined condition, and an image realization unit for realizing a simulation image of a trajectory of the ball based on the information extracted by the sensing processing unit.

In accordance with a further aspect of the present invention, there is provided a sensing method for virtual golf simulation, including acquiring a plurality of frame images of a ball hit by a user who swings at the ball, extracting ball candidates from the acquired frame images, converting three-dimensional coordinates of each of the ball candidates into two-dimensional coordinates to extract a two-dimensional trajectory of each of the ball candidates, and analyzing the two-dimensional trajectory of each of the ball candidates to extract a trajectory of the ball, thereby calculating information on physical properties of the moving ball.

Advantageous Effects

The virtual golf simulation apparatus and a sensing device and method used for the same according to the present invention has effects that an image of a golf ball hit by a user using virtual golf simulation, who swings a golf club to hit the golf ball, is acquired, and the golf ball is found from the acquired image to calculate the moving trajectory of the golf ball, thereby realizing a simulation image of the trajectory of the golf ball, and, particularly, in which two-dimensional trajectories of ball candidates, recognized as a ball, in an image acquired by the camera are analyzed to accurately and rapidly extract the ball, thereby accurately and rapidly calculating information on physical properties of the moving ball even using a camera having a low resolution and velocity.

BEST MODE

Now, exemplary embodiments of a virtual golf simulation apparatus according to the present invention and a sensing device and method used for the same will be described in detail with reference to the accompanying drawings.

First, a virtual golf simulation apparatus according to an embodiment of the present invention and a sensing device used in the same will be described with reference to FIGS. 1 and 2.

Figure 1:
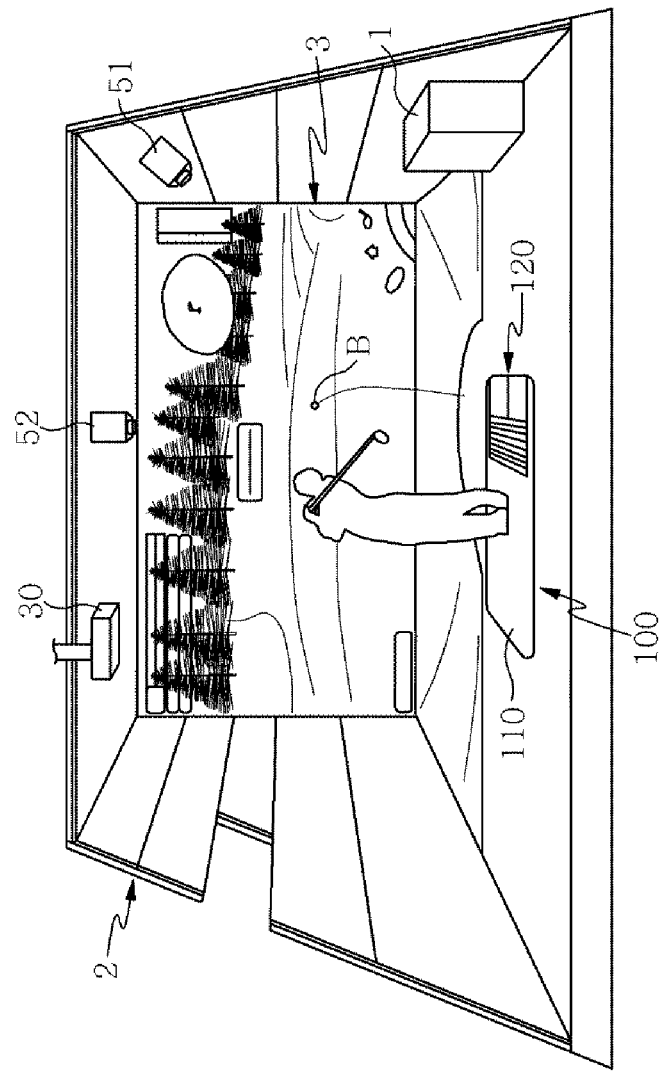
FIG. 1 is a view showing an example of a screen golf system to which a virtual golf simulation apparatus according to an embodiment of the present invention is applied.
Figure 2:
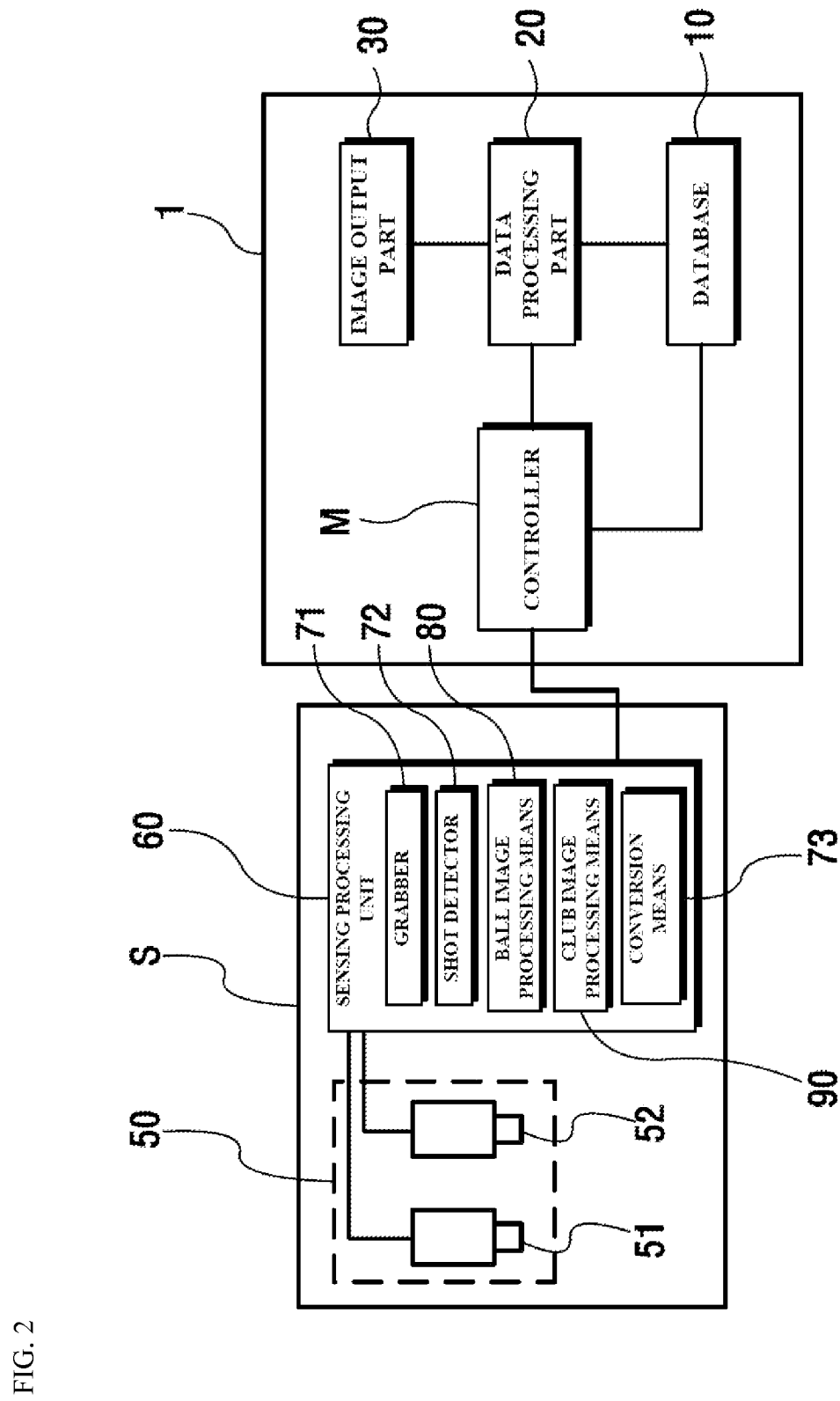
FIG. 2 is a block diagram showing the construction of a virtual golf simulation apparatus according to an embodiment of the present invention.

FIG. 1 is a view showing an example of a screen golf system to which a virtual golf simulation apparatus according to an embodiment of the present invention is applied, and FIG. 2 is a block diagram showing the construction of a virtual golf simulation apparatus applied to the screen golf system shown in FIG. 1.

As shown in FIGS. 1 and 2, the virtual golf simulation apparatus according to the embodiment of the present invention includes a sensing device S for sensing a golf ball B hit by a user and a simulator 1 for realizing an image of a virtual golf course and providing a simulation image of the trajectory of the golf ball B on the virtual golf course based on the result sensed by the sensing device S so that virtual golf simulation can be performed.

As shown in FIG. 1, the screen golf system, to which the virtual golf simulation apparatus according to the embodiment of the present invention is applied, may be configured to have a structure in which a hitting box 110, on which a user hits a golf ball B, is provided on the floor of a golf booth 2 providing a space of a predetermined size, a hitting mat 120, on which a golf ball B is placed so that the user can hit the golf ball B on the hitting box 110, is provided at one side of the hitting box 110, and a screen 3, on which an image of virtual golf simulation output from an image output device (an image output part 30 shown in FIG. 2, such as a beam projector), to which image information is transmitted from the simulator 1, is projected, is provided at the front of the golf booth 2.

The hitting box 110 and the hitting mat 120 are provided on a swing plate 100 as shown in FIG. 1. Alternatively, the hitting box 110 and the hitting mat 120 may be provided on the floor of the golf booth 2.

The swing plate 100 may be provided so that the swing plate 100 can be sloped at a predetermined angle in the forward and rearward direction and in the left and right direction. Also, the swing plate 100 may be connected to the simulator 1 so that the swing plate 100 can be sloped in correspondence to the topography of a virtual golf course which is presently being realized.

Meanwhile, as shown in FIG. 1, the sensing device S is provided in the golf booth 2 to sense a golf ball B hit by a user.

That is, as shown in FIG. 2, the sensing device S may include a camera unit 50 including a plurality of cameras 51 and 52, and a sensing processing unit 60 for processing an image acquired by the camera unit 50 to extract physical properties of the moving golf ball.

The camera unit 50 may be constituted by a single camera for image sensing or two or more cameras. In order to acquire an image of a moving golf ball B and extract coordinates of the golf ball in a three-dimensional space, it is preferable to configure a stereo type camera unit using two or more cameras 51 and 52, which are operatively connected to each other, as shown in FIG. 1.

The physical properties of the moving golf ball may include velocity of the golf ball, a moving direction of the golf ball (a moving angle of the golf ball in the horizontal direction), an altitude angle of the golf ball (a moving angle of the golf ball in the vertical direction), and spin of the golf ball.

The sensing processing unit 60 may include a grabber 71 for sequentially collecting images acquired by the camera unit 50 on a per frame basis, a shot detector 72 for receiving and processing the images collected by the grabber 71 to sense whether hitting preparation has been completed and whether hitting has been performed by a user, a ball image processing means 80 for processing an image of the hit golf ball received from the shot detector 72, when the shot detector 72 senses that the golf ball has been hit by the user, to extract information on physical properties of the moving golf ball, and a club image processing means 90 for analyzing the moving trajectory of a golf club from the image received from the shot detector 72 to extract information on spin of the ball.

Also, the sensing processing unit 60 may further include a conversion means 73 for matching images acquired by the cameras 51 and 52 to convert two-dimensional information of each camera image (information extracted from each camera is two-dimensional information) into three-dimensional information or to inversely convert three-dimensional information extracted by matching a plurality of camera images into two-dimensional information.

Meanwhile, the simulator 1 constituting the virtual golf simulation apparatus according to the embodiment of the present invention preferably includes a controller M, a database 10, an data processing part 20 and an image output part 30.

The database 10 stores all data necessary for virtual golf simulation. For example, the database 10 stores data necessary to drive the system, data necessary to realize an image of a virtual golf course, and data necessary to realize a simulation image of the trajectory of a golf ball.

The data processing part 20 is a part which performs predetermined image processing to realize an image of a virtual golf course or a simulation image of the trajectory of a golf ball on the virtual golf course.

The image output part 30 outputs image information received from the data processing part 20 to a screen so that a user can watch the image. The controller M receives information based on the result sensed by the sensing device S to control operations of all components, such as the database 10, the data processing part 20 and the image output part 30, of the simulator 1. That is, the controller M, the database 10 and the data processing part 20 function as an image realization unit for realizing a simulation image of the trajectory of a golf ball based on the result sensed by the sensing device S.

Hereinafter, more detailed construction of the sensing device S shown in FIG. 2 and functions of the respective components constituting the sensing device will be described with reference to FIG. 3.

Figure 3:
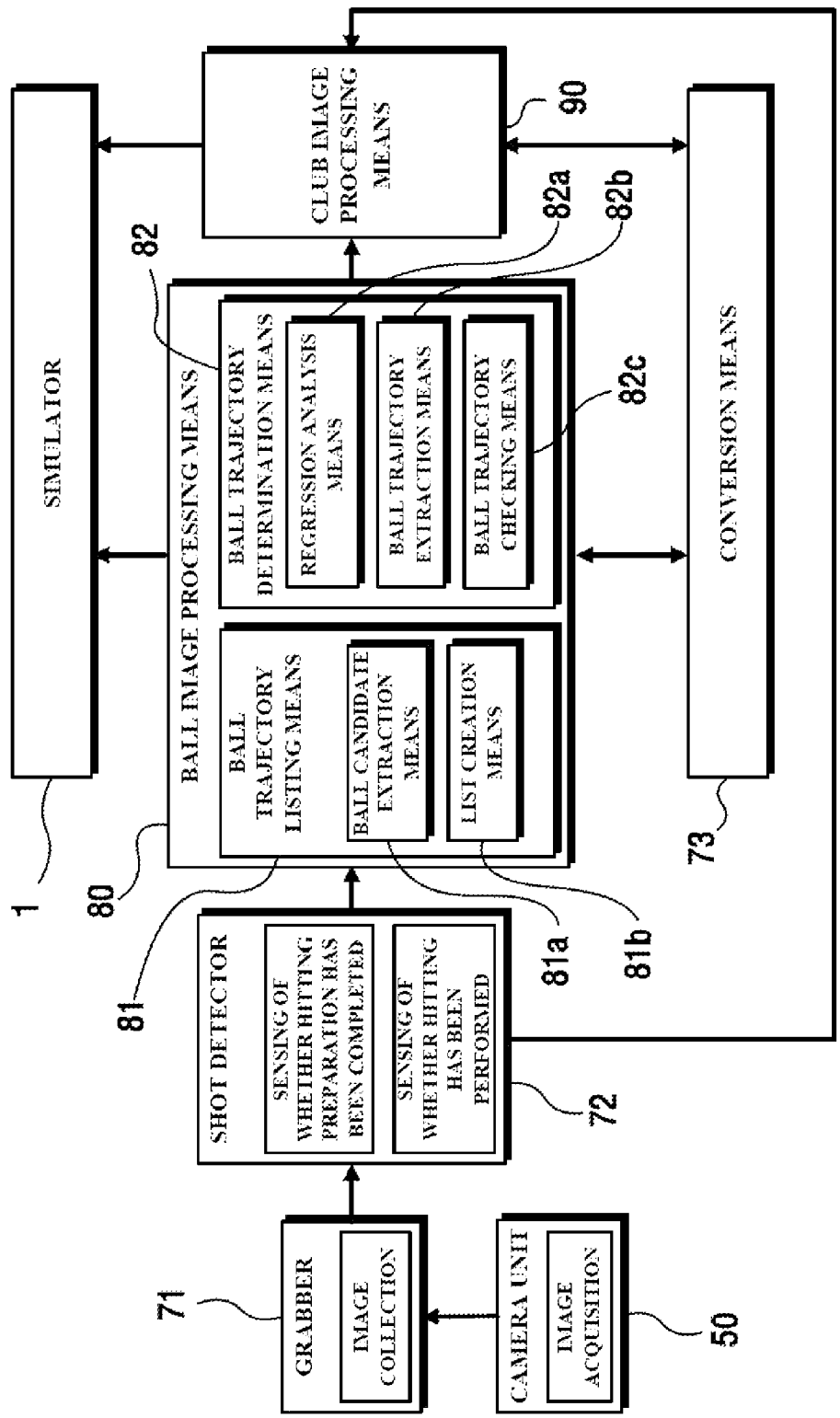
FIG. 3 is a view schematically showing more detailed construction of a sensing device shown in FIG. 2 and functions of components constituting the sensing device.

As shown in FIG. 3, transmission of information in the sensing device according to the present invention is carried out in the order of the camera unit 50→the grabber 71→the shot detector 72→the ball image processing means 80 and the club image processing means 90→the simulator 1.

The camera unit 50 captures a predetermined range including a portion at which the hitting box and the hitting mat are provided to acquire hundreds of frame images per second.

The acquired frame images are transmitted to the grabber 71. The grabber 71 stores the images received from the camera unit 50 and, at the same time, transmits the images to the shot detector 72 so that which image processing is carried out.

Preferably, the shot detector 72 finds a ball from the image received from the grabber and determines whether the ball satisfies a predetermined condition to sense whether hitting preparation has been completed. Also, the shot detector 72 determines whether the ball is moved from a position at which the hitting preparation has been completed to sense whether hitting has been performed by a user.

A method of the shot detector 72 sensing whether hitting preparation has been completed and sensing whether hitting has been performed is not the core of the present invention, and therefore, a detailed description thereof will be omitted.

Upon sensing that the user has hit the golf ball, the shot detector 72 stores an image when the golf ball has been hit and a plurality of frame images thereafter. These images are transmitted to the ball image processing means 80 in real time so that the images can be processed by the ball image processing means 80.

In addition, upon sensing that the user has hit the golf ball, the shot detector 72 also stores a plurality of frame images before the golf ball has been hit and transmits the stored frame images to the club image processing means 90. The club image processing means 90 extracts an image of a golf club from the image received from the shot detector 72 and the image processed by the ball image processing means 80 to derive the moving trajectory of a head of the golf club, thereby estimating spin of the ball.

Information on physical properties of the ball extracted by the ball image processing means 80 and the club image processing means 90 is transmitted to the simulator 1. The simulator 1 outputs a simulation image, in which the ball is moved on a virtual golf course, based on the received information so that virtual golf simulation can be performed.

The ball image processing means 80 basically extracts ball candidates from the images in the respective frames acquired by the camera unit 50, converts three-dimensional coordinates of each of the ball candidates into two-dimensional coordinates, and analyzes the two-dimensional trajectory of each of the ball candidates to extract the final trajectory of the golf ball, thereby calculating information on physical properties of the moving golf ball.

Specifically, the ball image processing means 80 preferably includes a ball trajectory listing means 81 for extracting ball candidates from the respective frames with respect to the images acquired by the camera unit 50 and for creating a ball trajectory list to connect the respective ball candidates with respect to the successive frames and a ball trajectory determination means 82 for performing second-order polynomial regression analysis with respect to the created ball trajectory list to create ball trajectory candidates and for extracting the trajectory of a ball from the ball trajectory candidates according to a predetermined condition.

The ball trajectory listing means 81 preferably includes a ball candidate extraction means 81a for processing the respective frame images to extract ball candidates from the respective frames and a list creation means 81b for combining the ball candidates in the respective frames to create a ball trajectory list.

The ball trajectory determination means 82 preferably includes a ball trajectory extraction means 82a for mapping coordinates of the respective ball candidates of the ball trajectory list created by the list creation means 81b on a plane of a three-dimensional coordinate system, i.e. mapping three-dimensional coordinates of the respective ball candidates into two-dimensional coordinates on a plane, to create two-dimensional trajectory, i.e. ball trajectory candidates, thereby performing second-order polynomial regression analysis, a regression analysis means 82b for checking a second-order function of each of the ball trajectory candidates to extract ball trajectory candidates satisfying a predetermined condition, and a ball trajectory checking means 82c for checking whether the ball trajectory candidates extracted by the regression analysis means 82b satisfy a predetermined condition based on physical properties of a moving ball to select the final trajectory of the ball.

Since the image acquired by each camera contains various kinds of noise (for example, a specific portion of a landform around the ball, a portion of the body of a user, and a head portion of the golf club) having a shape similar to the ball as well as an image of the ball, it is necessary to accurately extract the ball from the image. To this end, three-dimensional coordinates are mapped into two-dimensional coordinates to obtain two-dimensional trajectories, and the two-dimensional trajectories are analyzed to remove two-dimensional trajectories that can be considered as the trajectory of the ball, to extract two-dimensional trajectories that can be physically considered as the moving trajectory of the ball, to select the final trajectory of the ball, and to obtain coordinates of the ball on the selected trajectory of the ball, thereby calculating final physical properties of the ball.

Hereinafter, creation of a list through extraction of ball candidates performed by the ball trajectory listing means and combination of the extracted ball candidates will be described with reference to FIGS. 3 to 8.

Figure 4:
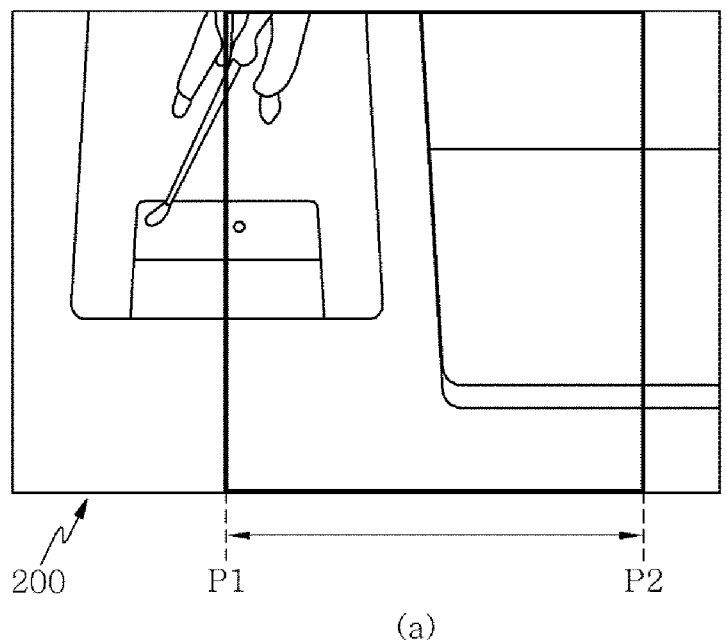
FIG. 4(a) is a view showing an image acquired by a camera unit.
FIG. 4(b) is a view showing a source image obtained by separating a region corresponding to a predetermined section from the image shown in FIG. 4(a)
Figure 4:
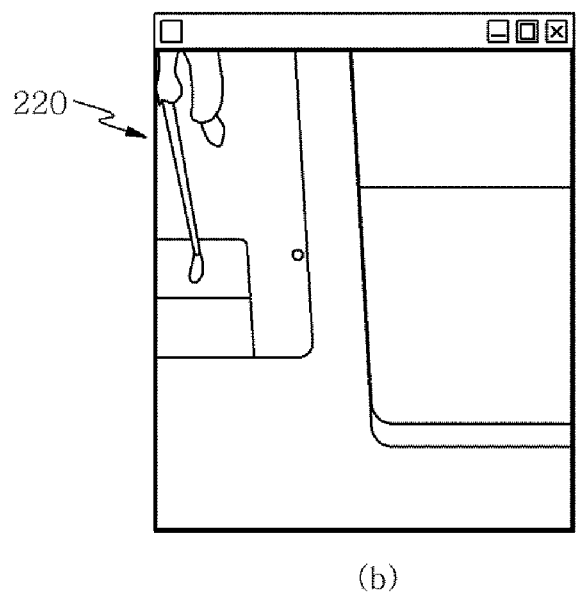

First, the ball candidate extraction means 81*a* of the ball trajectory listing means 81 separates a source image 220 shown in FIG. 4(*b*) from an image 200 acquired by the camera as shown in FIG. 4(*a*).

Since the image 200 acquired by the camera contains the entire image of a wide capturing region, it takes a great deal of time to process the image 200. For this reason, a necessary portion is extracted and only the extracted image is processed, thereby reducing image processing time. The source image 220 shown in FIG. 4(*b*) may be defined as an image of a section ranging from a point P1, at which hitting has been performed, to a point P2, which is distant from the point P1 by a predetermined distance in the forward direction, of the image shown in FIG. 4(*a*).

That is, when the ball is hit, the ball flies toward the screen 3 (see FIG. 1). Consequently, movement of the ball from a point at which hitting has been performed to a point distant from the point at which the hitting has been performed by a predetermined distance in the forward direction is analyzed, thereby sufficiently calculating information, such as velocity, direction and altitude angle, of the ball.

The point P2 shown in FIG. 4(*a*) may be a position corresponding to the screen 3 (see FIG. 1) or a position distant from the screen by a predetermined distance in the inward direction.

The point P1 and the point P2 are designated from the image acquired by the camera, and an image corresponding to the section between the point P1 and the point P2 is separated from the image acquired by the camera to obtain a source image as shown in FIG. 4(*b*).

Figure 5:
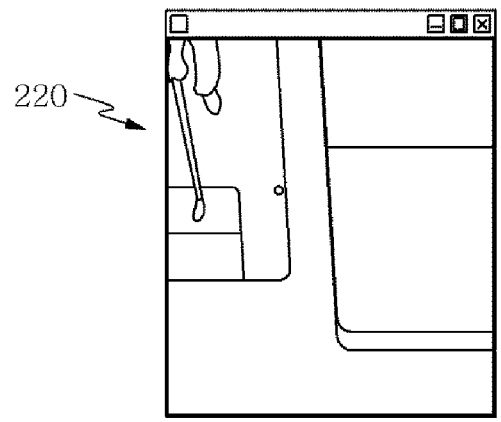
FIG. 5(a) is a view showing a source image.
FIG. 5(b) is a view showing a still background image.
FIG. 5(c) is a view showing an image obtained by removing the background image from the source image.
Figure 5:
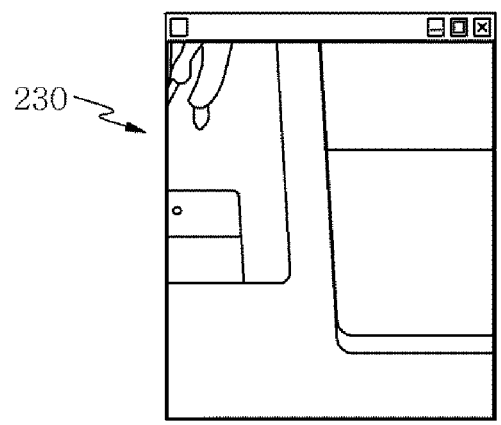
Figure 5:
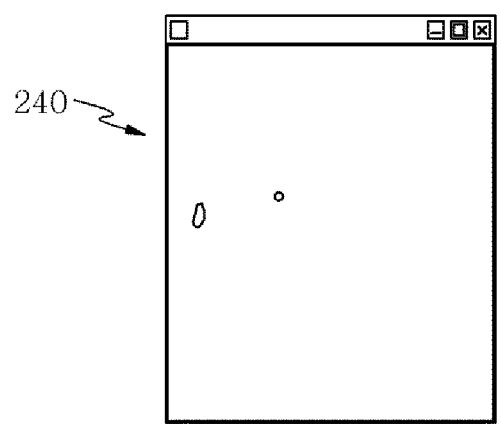

Meanwhile, a background image is removed from the source image obtained as described above through a difference operation as shown in FIG. 5 to obtain only ball candidates. For example, a background image 230 shown in FIG. 5(*b*) may be removed from the source image 220 shown in FIG. 5(*a*) through a difference operation to obtain an image having only moving portions as shown in FIG. 5(*c*).

The moving portions on the image 240 extracted through the difference operation are not considered as a ball. Some of the moving portions may be noise, such as a portion of the head of the golf club or a portion of the body of the user.

Consequently, the ball candidate extraction means 81*a* designates the portions considered to be the ball in the image 240 obtained through the difference operation based on geometrical properties of the ball as the ball candidates. For example, a portion, a large width to height ratio of which is large, cannot be considered as a ball, and therefore, such a portion is excluded. Also, a portion, which has a size of one or two pixels, i.e. which is very small, cannot be considered as a ball, and therefore, such a portion is excluded.

The remaining portions of the image obtained based on geometrical properties of the ball as described above are designated as primary ball candidates. The primarily ball candidates are compared with a ball template. The primary ball candidates, similar to the ball template to such an extent that a degree of similarity is equal to or greater than a predetermined level, are designated as secondary ball candidates.

A ball template is an image preset and stored as a reference image of a ball. Primary ball candidates, numerically similar to the ball template by a predetermined level, are designated as secondary ball candidates.

The ball candidate extraction means 81*a* preferably include a template matching means for matching the primary ball candidates with the ball template to extract a degree of similarity therebetween, thereby extracting secondary ball candidates.

However, it is not easy to compare the ball candidates with the ball template as described above in order to accurately find a ball. The reason is that the size of the ball may be different in different frames. That is, the capturing region of the camera is fixed, and the distance between the camera and the ball is changed in the capturing region according to the movement of the ball, with the result that the sizes of the images of the moving ball in the frames may be different from each other. Consequently, the size of the ball may be different in different frames, and the size of the ball template is fixed, with the result that it is difficult to accurately determine how similar the ball candidates are to the ball template.

For this reason, the template matching means estimates the size of the ball candidates and variably matches the ball candidates with the ball template based on the estimated size of the ball candidates to extract a degree of similarity therebetween, and therefore, it is possible to find the ball with high accuracy.

Figure 6:
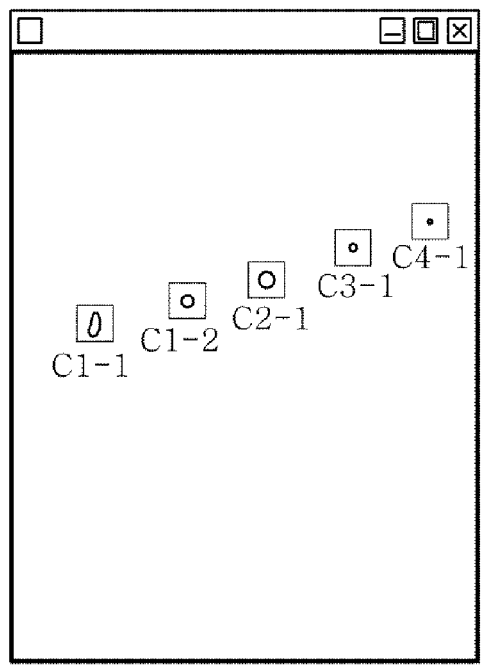
FIG. 6(a) is a view showing ball candidates of several frames on an image obtained by combining several frames, which are processed as shown in FIGS. 4 and 5 to extract ball candidates.
FIG. 6(b) is a view showing a ball template T preset and stored as a reference image of a ball.
Figure 6:

FIG. 6(*a*) is a view showing ball candidates (primarily extracted ball candidates) of several frames on an image to illustrate that the template matching means variably matches the ball candidates with the ball template, and FIG. 6(*b*) is a view showing the ball template T.

In FIGS. 6(*a*), C1-1 and C1-2 indicate ball candidates extracted from a first frame of a source image, C2-1 indicates a ball candidate extracted from a second frame, C3-1 indicates a ball candidate extracted from a third frame, and C4-1 indicates a ball candidate extracted from a fourth frame. It can be seen that the sizes of the ball candidates in the respective frames are different from each other.

First, the template matching means estimates the size of the ball candidates C1-1 to C4-1 for variable matching with the ball template. That is, when a ball candidate is simultaneously captured by a plurality of cameras, it is possible to acquire coordinates of the ball candidate in a three-dimensional space (two-dimensional information of an image acquired by each camera may be converted into three-dimensional information by the conversion means 73 (see FIGS. 2 and 3) and the three-dimensional information may be extracted). Also, it is possible to obtain information, such as the distance between the ball candidate and a corresponding one of the cameras, from the coordinates of the ball candidate to estimate the size of the ball candidate.

In addition, the size of each of the ball candidates estimated as described above is changed so that the size of each of the ball candidates is equivalent to the size of the ball template or the size of the ball template is changed so that the size of the ball template is equivalent to the size of each of the ball candidates, and the respective ball candidates are compared with the ball template to determine how similar the ball candidates are to the ball template, thereby easily finding which of the ball candidates are similar to a real ball.

That is, each of the ball candidates is normalized so that the size of each of the ball candidates is equivalent to the size of the ball template T or the ball template T is normalized so that the size of the ball template T is equivalent to the size of each of the ball candidates in consideration of the estimated size of each of the ball candidates, and then the ball candidates are compared with the ball template T.

Normalization of a ball candidate is a process of deforming a ball candidate image so that the size of the ball candidate is equivalent to the size of a ball template T while maintaining the shape and pixel ratio of the ball candidate image, thereby achieving easy comparison between the ball candidate and the ball template. On the other hand, normalization of a ball template T is a process of deforming a ball template image so that the size of the ball template T is equivalent to the size of a corresponding ball candidate while maintaining the shape and pixel ratio of the ball template image, thereby achieving easy comparison between the ball template and the ball candidate.

Upon completing normalization of the ball candidates or the ball template as described above, the ball candidates are compared with the ball template to extract a degree of similarity therebetween, thereby selecting the ball candidates, having a degree of similarity equal to or greater than a predetermined value, as secondary ball candidates.

The degree of similarity is converted into a numerical value determined based on various determination criteria, such as overall shape, pixel ratio and pixel value distribution.

Meanwhile, an example of ball candidates extracted from the respective frame images by the ball candidate extraction means 81a as described above is shown in FIG. 7.

Figure 7:
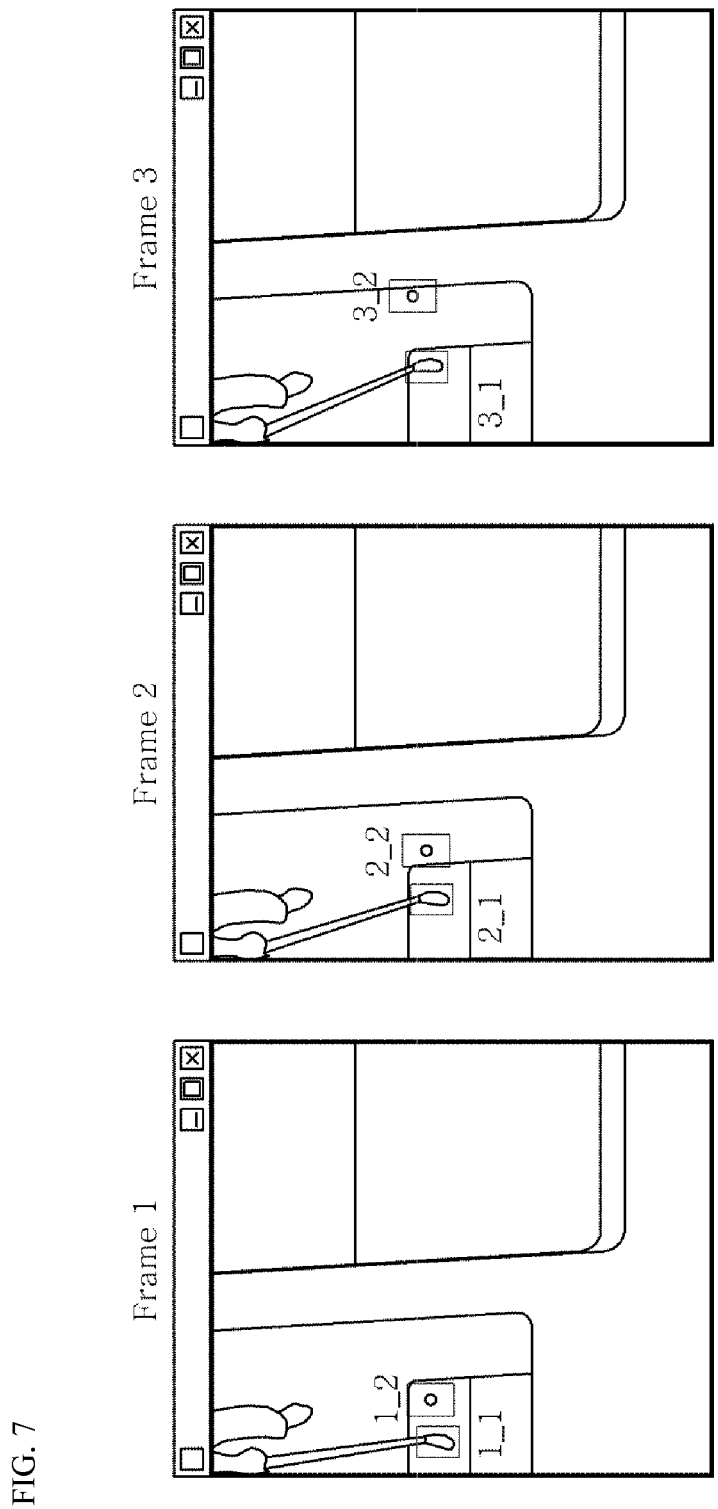
FIG. 7 is a view showing finally selected ball candidates in respective frames.

It can be seen from the example of FIG. 7 that ball candidates 1_1 and 1_2 are finally extracted from frame No. 1, ball candidates 2_1 and 2_2 are finally extracted from frame No. 2, and ball candidates 3_1 and 3_2 are finally extracted from frame No. 3. Of course, ball candidates as described above may be extracted from several tens or several hundreds of frames.

The list creation means 81b of the ball trajectory listing means 81 combines the ball candidates illustrated in FIG. 7 according to the number of cases to create a ball trajectory list.

Figures 8, 9:
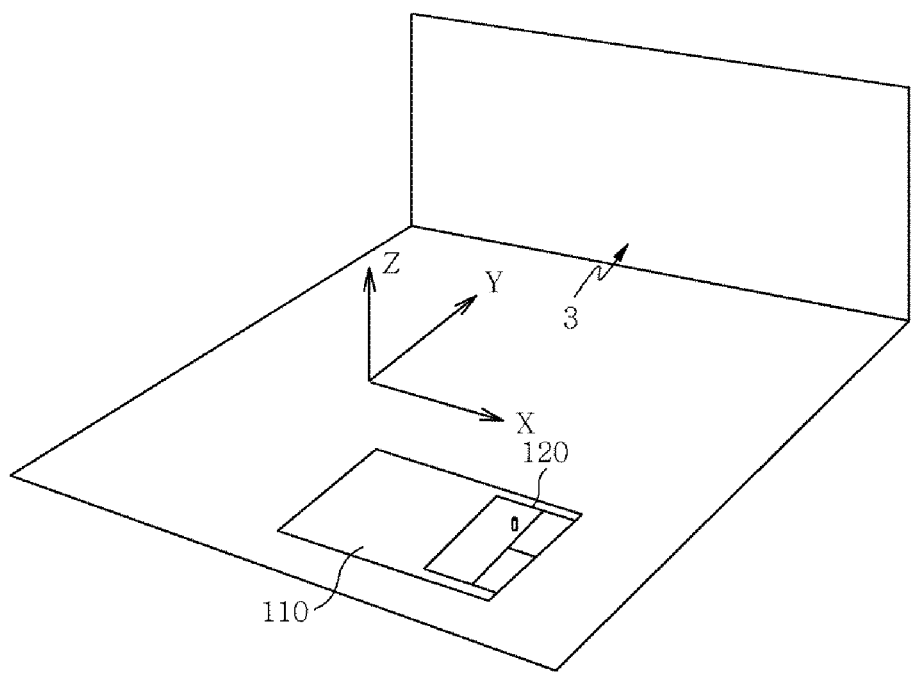
FIG. 8 is a view showing an example of combining ball candidates in the respective frames shown in FIG. 7 to create a ball trajectory list.
FIG. 9 is a view showing a coordinate system used in the sensing device of the virtual golf simulation apparatus according to the embodiment of the present invention.

That is, as shown in FIG. 8, the ball candidates are combined for each frame according to the number of cases to create a ball trajectory list. FIG. 8 shows only track No. 1 to track No. 5 as a ball trajectory list with respect to three frames. Of course, many ball candidates may be combined with respect to several tens or several hundreds of frames to create tracks.

Meanwhile, when the ball trajectory list is created by the ball trajectory listing means 81 as described above, the ball trajectory determination means 82 (see FIG. 3) extracts the trajectory of a real ball using the ball trajectory list to calculate information on physical properties of the moving ball.

The ball trajectory extraction means 82a of the ball trajectory determination means 82 extracts three-dimensional coordinate values of the ball candidates on the respective tracks of the ball trajectory list (see FIG. 8) created by the list creation means 81b (the respective camera images may be matched by the conversion means 73 (see FIGS. 2 and 3) to extract three-dimensional information) and maps the three-dimensional coordinate values of the ball candidates on a two-dimensional plane.

That is, a coordinate system is defined on the assumption that the width direction, in which the hitting box 110 and the hitting mat 120 are placed, is an x axis, the length direction, in which the screen 3 is placed, is a y axis, and the perpendicular direction is a z axis, as shown in FIG. 9.

In the coordinate system of the x axis, the y axis and the x axis, the ball trajectory extraction means 82a maps coordinates of the ball candidates on the respective tracks of the ball trajectory list on a yz plane. At this time, the conversion means 73 (see FIGS. 2 and 3) may convert three-dimensional coordinate information of the ball candidates on the list into two-dimensional coordinate information on the yz plane.

Figure 10:
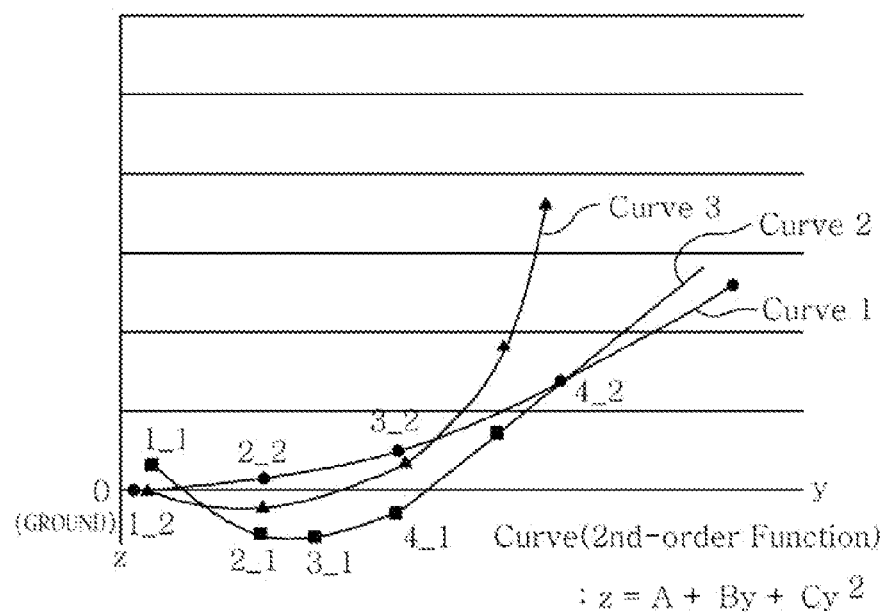
FIG. 10 is a view showing ball trajectory candidates derived by mapping the ball trajectory list shown in FIG. 8 on a yz plane.

FIG. 10 is a view showing an example of ball candidates of the ball trajectory list mapped by the ball trajectory extraction means 82a on the yz plane.

As shown in FIG. 10, two-dimensional trajectories curve 1 to curve 3, i.e. ball trajectory candidates, may be derived from the ball candidates 1_1 to 4_2 on the yz plane according to combination on the ball trajectory list.

A second-order function of each of the ball trajectory candidates, i.e. each of the two-dimensional trajectories, may be calculated in the form of $z=A+By+Cy^2$, where A, B and C are constants. Also, B is a first-order coefficient, and C is a second-order coefficient. If $C>0$, the two-dimensional trajectory is convex downward. On the other hand, If $C<0$, the two-dimensional trajectory is convex upward.

The regression analysis means 82b of the ball trajectory determination means 82 checks the second-order coefficient of the second-order function of each of the ball trajectory candidates to extract the ball trajectory candidates primarily approaching the trajectory of the ball.

That is, it can be seen that curve 2 and curve 3 of the two-dimensional trajectories shown in FIG. 10 are excessively convex downward, penetrating the ground.

If a ball is actually hit, the ball flies over the ground but does not penetrate the ground. For this reason, curve 2 and curve 3 convex under the ground may be incorrect trajectories or trajectories containing a trajectory of the golf club.

Consequently, the trajectories excessively convex under the ground, i.e. curve 2 and curve 3, may be excluded.

That is, the incorrect trajectories or the trajectory of the golf club may be confirmed by checking the second-order coefficient of each of the second-order function. If a second-order coefficient of a trajectory is less than a predetermined value, it is determined that the trajectory is an incorrect trajectory or a trajectory of a golf club, and therefore, the trajectory may be excluded. Such a predetermined value may be properly preset through experimentation.

If the number of the ball trajectory candidates extracted by the regression analysis means 82b is 1 as described above, the ball trajectory candidate may be determined as the trajectory of the ball. On the other hand, if the number of the ball trajectory candidates extracted by the regression analysis means 82b is greater than 1, an incorrect trajectory(s) is removed based on another specific criterion to obtain the final trajectory of the ball.

If the number of the ball trajectory candidates extracted by the regression analysis means 82b is greater than 1, the ball trajectory checking means 82c of the ball trajectory determination means 82 checks whether coordinate movement of the respective ball candidates on the trajectories of the respective ball trajectory candidates satisfies a predetermined condition and selects the ball trajectory candidate satisfying the predetermined condition as the final trajectory of the ball.

Figure 11:
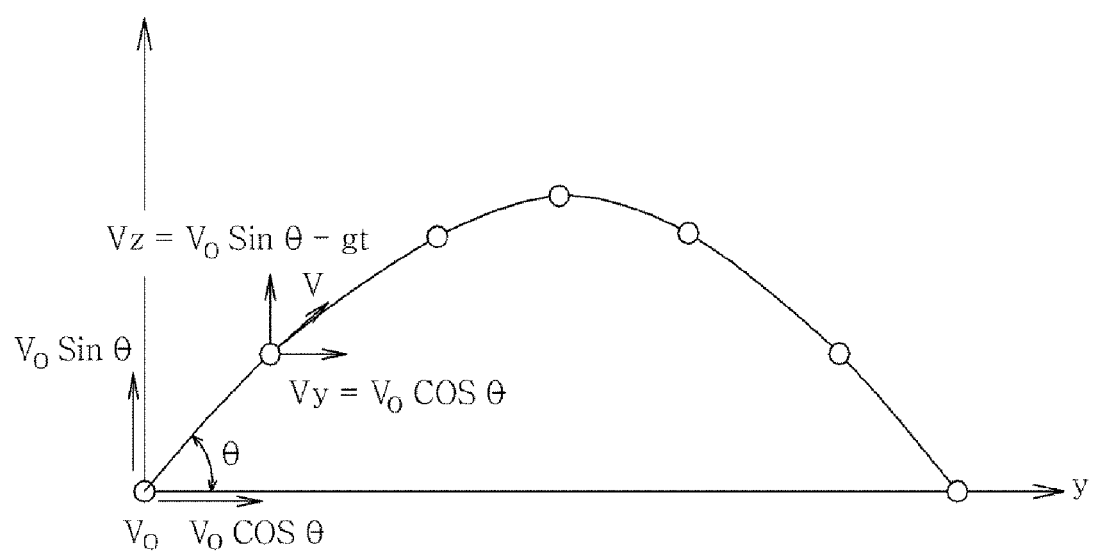
FIG. 11 is a view illustrating physical properties of a moving ball.

The predetermined condition applied to the ball trajectory checking means 82c may be set from physical properties of a moving ball as shown in FIG. 11.

As shown in FIG. 11, a horizontal velocity of a ball may be defined as $V_0 \cos\theta$ and a vertical velocity of a ball may be defined as $V_0 \sin\theta$ on the assumption that the ball is moved at an initial velocity $V_0$ and an altitude angle $\theta$.

As the ball is moved, the horizontal velocity Vy of the ball is maintained as $V_0 \cos\theta$ without change, and the vertical velocity Vz of the ball becomes $V_o \sin\theta - gt$ due to the acceleration of gravity gt (where, t indicates moving time of the ball).

That is, theoretically, when the ball is moved as shown in FIG. 11, the coordinates of the ball are moved at uniform velocity in the y axis direction, and the coordinates of the ball are moved at uniform acceleration in the z axis direction.

However, actually, when the ball is moved, various variables, such as resistance of air, exist according various environments. As a result, the ball is not moved as shown in FIG. 11. In a case in which the ball is moved within a very short section, however, effects caused by various variables may be ignored, and therefore, the theoretical properties as shown in FIG. 11 are accurately applied to a certain extent.

That is, in a case in which movement of a ball from the hitting mat 120 to the screen 3 is sensed by the sensing device in the screen golf system shown in FIG. 1, the length of the section is very short, for example, approximately 5 m to 7 m. Consequently, it may be considered that the ball is moved according to the theoretical properties as shown in FIG. 11.

Consequently, the ball trajectory checking means 82c checks coordinate movement of the respective ball candidates on the ball trajectory candidates, extracts the ball trajectory candidate moving at almost uniform velocity in the y axis direction and at almost uniform acceleration in the z axis direction, and determines the extracted ball trajectory candidate as the final trajectory of the ball.

Coordinates of each ball on the trajectory extracted as the final trajectory of the ball as described above are converted into three-dimensional coordinates (two-dimensional coordinates may be converted into three-dimensional coordinates by the conversion means 73 (see FIGS. 2 and 3)), and coordinate movement of each ball in a three-dimensional space is analyzed to calculate information on physical properties of the moving ball.

Figure 12:
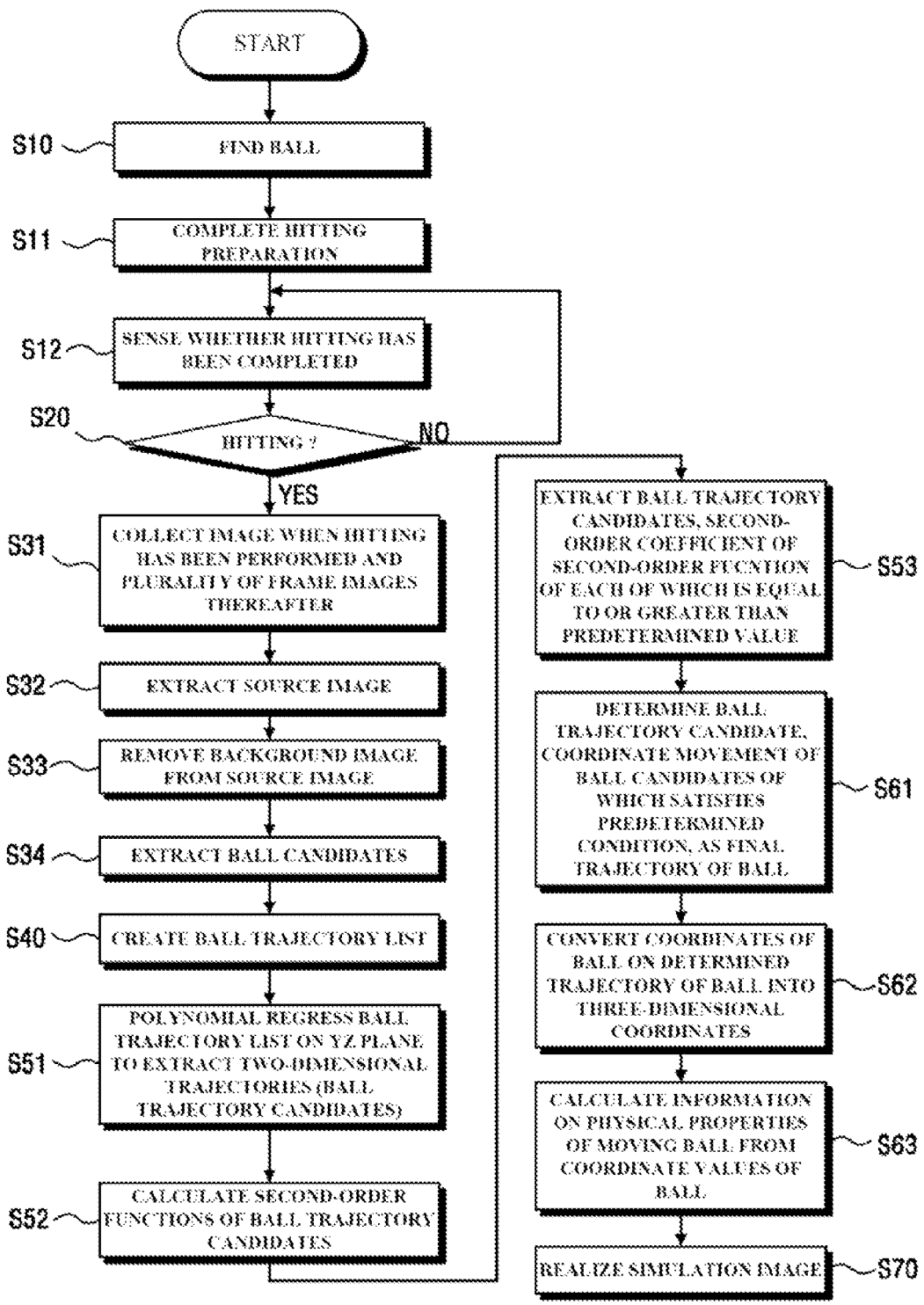
FIG. 12 is a flow chart showing a sensing method for virtual golf simulation according to an embodiment of the present invention.

Hereinafter, a sensing method for virtual golf simulation according to an embodiment of the present invention will be described with reference to FIG. 12.

First, when virtual golf simulation is commenced, a user places a ball on the hitting mat so that the user can hit the ball. At this time, the sensing device acquires an image of the ball placed on the hitting mat, and finds a ball from the acquired image (S10). Such a ball finding process is carried out by the shot detector.

The ball is found from the acquired image and information on coordinates at which the ball is placed is confirmed. If a predetermined condition is satisfied, hitting preparation is completed (S11).

Upon completing hitting preparation, the shot detector starts to sense whether hitting has been completed by the user (S12). Upon sensing that hitting has been completed (S20), the shot detector confirms when hitting has been completed, collects a frame image when hitting has been completed and a plurality of frame images thereafter (S31), and transmits the collected frame images to the ball image processing means. On the other hand, upon sensing that hitting has not been completed, the procedure returns to the hitting sensing step (S12).

If the shot detector collects the plurality of frame images and transmits the collected frame images to the ball image processing means in real time after sensing that hitting has been completed, the ball image processing means separates a predetermined region from the received image to extract a source image (S32).

Subsequently, the ball image processing means removes a background image from the extracted source image (S33) to extract ball candidates (S34). Extraction of the ball candidates was previously described in detail, and therefore, a further description thereof will be omitted.

After the ball candidates are extracted for each frame, the ball candidates of the successive frames are combined to create a ball trajectory list (S40).

The ball trajectory list is polynomial regressed on a yz plane to extract two-dimensional trajectories, i.e. ball trajectory candidates (S51).

Since the respective ball trajectory candidates are two-dimensional trajectories, second-order functions of the respective ball trajectory candidates are calculated (S52), and a second-order coefficient of each of the calculated second-order functions is compared with a predetermined value to extract only the ball trajectory candidates having a second-order coefficient equal to or greater than the predetermined value (S53).

Of the extracted ball trajectory candidates, the ball trajectory candidate, coordinate movement of the ball candidates of which satisfies a predetermined condition (the uniform velocity motion condition in the horizontal direction and the uniform acceleration motion condition in the vertical direction as shown in FIG. 11), is determined as the final trajectory of the ball (S61).

Subsequently, coordinates of the ball on the determined trajectory of the ball are converted into three-dimensional coordinates (S62) to calculate information on physical properties of the moving ball from the coordinate values (S63).

The calculated information on physical properties of the moving ball is transmitted to the simulator, and the simulator realizes a simulation image of the trajectory of the ball based on the received information on physical properties of the moving ball (S70).

Mode for Invention

Various embodiments of the present invention have been described in the best mode.

INDUSTRIAL APPLICABILITY

The virtual golf simulation apparatus and method and a sensing device and method used for the same according to the present invention can be used in industries related to a golf game or so-called Screen Golf for a user to be able to play a virtual golf round by golf simulation based on a virtual reality.

The invention claimed is:

1. A sensing device used in a virtual golf simulation apparatus, comprising:
   a camera unit configured to acquire a plurality of successive frame images of a physical ball hit by a user who swings at the physical ball; and
   a sensing processing unit configured to process the successive frame images acquired by the camera unit to calculate physical properties of movement for the physical ball and to provide a virtual ball trajectory,
   wherein the sensing processing unit is configured to,
      extract ball candidates from the acquired successive frame images,
      connect the respective ball candidates with respect to the acquired successive frame images,
      convert three-dimensional coordinates of the connected ball candidates into two-dimensional coordinates, and provide two-dimensional trajectories thereof,
      analyze the two-dimensional trajectories of the connected ball candidates to extract a trajectory of the physical ball,
      convert two-dimensional coordinates of physical ball on the trajectory into three-dimensional coordinates, and
      calculate the physical properties of the movement for the physical ball based on a three-dimensional trajectory from the converted three-dimensional coordinates of the physical ball.

2. A sensing device used in a virtual golf simulation apparatus, comprising:
   a camera unit configured to acquire a plurality of successive frame images of a physical ball hit by a user who swings at the physical ball; and
   a sensing processing unit configured to extract ball candidates from the acquired successive frame images, convert three-dimensional coordinates of each of the ball candidates into two-dimensional coordinates, analyze a two-dimensional trajectory of each of the ball candidates based on the converted two-dimensional coordinates to extract a trajectory of the physical ball, calculate information on physical properties of the physical ball from the extracted trajectory, and provide a virtual ball trajectory wherein the sensing processing unit is configured to, create a ball trajectory list by connecting the respective ball candidates with respect to the acquired successive frame images, and perform second-order polynomial regression analysis with respect to the created ball trajectory list to create ball trajectory candidates and extract the trajectory of the physical ball from the ball trajectory candidates according to a predetermined condition.

3. The sensing device according to claim 2, wherein, for extracting the ball candidates, the sensing processing unit is configured to preset and store a ball template as a reference image of the physical ball and for extracting ball candidates matched with the ball template from the acquired images.

4. The sensing device according to claim 2, wherein, for extracting the physical ball trajectory, the sensing processing unit is configured to, map coordinates of the created ball trajectory list on a plane of a three-dimensional coordinate system to create the ball trajectory candidates to perform the second-order polynomial regression analysis, and check a second-order function of each of the ball trajectory candidates to extract the ball trajectory candidates satisfying the predetermined condition.

5. The sensing device according to claim 4, wherein, for the second-order polynomial regression analysis, the sensing processing unit is configured to extract the ball trajectory candidates having a second-order coefficient of a second-order function equal to or greater than a predetermined value.

6. The sensing device according to claim 4, wherein, for extracting the physical ball trajectory, the sensing processing unit is configured to check whether the ball trajectory candidates satisfy the predetermined condition based on the physical properties of the physical ball to select a final trajectory.

7. The sensing device according to claim 6, wherein, for the second-order function, the sensing processing unit is configured to check whether coordinate movement of the respective ball candidates on the trajectories of the ball trajectory candidates satisfies the predetermined condition and select the ball trajectory candidate satisfying the predetermined condition as the final trajectory.

8. A virtual golf simulation apparatus for a user to play virtual golf in a virtual gold course by imaging processing comprising the sensing device according to claim 1.

9. A sensing method for virtual golf simulation using a sensing device including a camera unit acquiring a plurality of successive frame images of a physical ball hit by a user who swings the physical ball, a sensing process unit processing the images acquired by the camera unit to extract physical properties of the physical ball and providing a virtual ball trajectory, the sensing method processed by the sensing processing unit, comprising:

extracting ball candidates from the plurality of successive frame images acquired by the camera unit;

creating a ball trajectory list by connecting the respective ball candidates with respect to the plurality of successive frame images;

converting three-dimensional coordinates of the connected candidates into two-dimensional coordinates;

performing second-order polynomial regression analysis with respect to the created ball trajectory list to create ball trajectory candidates;

extracting a trajectory of the physical ball from the created ball trajectory candidates when the ball trajectory candidates satisfy a predetermined condition for the physical ball trajectory;

converting two-dimensional coordinates of the extracted physical ball trajectory into three-dimensional coordinates; and calculating information on the physical properties of the physical ball based on three-dimensional trajectory of the converted three-dimensional coordinates.

10. The sensing method according to claim 9, wherein the step of extracting ball candidates comprises:

removing a background image from each of the acquired images; and matching objects present in each of the images, from each of which the background image has been removed, with a ball template preset and stored as a reference image of the physical ball to extract the ball candidates.

11. The sensing method according to claim 9, wherein the step of creating the ball trajectory list comprises combining the ball candidates on the respective frames according to the number of cases, in which the ball candidates are combined, to create a ball trajectory list corresponding to the number of cases, in which the ball candidates are combined.

12. The sensing method according to claim 9, wherein the step of creating the ball trajectory candidates comprises:

mapping coordinates of each of the ball candidates in the created ball trajectory list on a yz plane to create a two-dimensional trajectory; and calculating a second-order function of the two-dimensional trajectory on the yz plane.

13. The sensing method according to claim 12, wherein the step of determining the ball trajectory candidates, satisfying the predetermined condition, as the trajectory of the ball comprises:

comparing a second-order coefficient of the second-order function with a predetermined value; and extracting a two-dimensional trajectory having the second-order function, the second-order coefficient of which is equal to or greater than the predetermined value.

14. The sensing method according to claim 13, wherein the step of determining the ball trajectory candidates, satisfying the predetermined condition, as the trajectory of the physical ball comprises:

checking whether the two-dimensional trajectory, the second-order coefficient of which is equal to or greater than the predetermined value, satisfies the predetermined condition based on the physical properties of the physical ball; and determining the two-dimensional trajectory, satisfying the predetermined condition based on the physical properties of the physical ball.

* * * * *